`US009342894B1`

United States Patent
Gopalakrishnan

(10) Patent No.: US 9,342,894 B1
(45) Date of Patent: May 17, 2016

(54) CONVERTING REAL-TYPE NUMBERS TO INTEGER-TYPE NUMBERS FOR SCALING IMAGES

(71) Applicant: Amazon Technologies, Inc., Seattle, WA (US)

(72) Inventor: Anil Raj Rajam Gopalakrishnan, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/702,013

(22) Filed: May 1, 2015

(51) Int. Cl.
| | |
|---|---|
| *G06T 7/00* | (2006.01) |
| *G06K 9/00* | (2006.01) |
| *G06K 9/62* | (2006.01) |
| *H04N 1/393* | (2006.01) |
| *G06T 15/10* | (2011.01) |

(52) U.S. Cl.
CPC .......... *G06T 7/0081* (2013.01); *G06K 9/00221* (2013.01); *G06K 9/00228* (2013.01); *G06K 9/00261* (2013.01); *G06K 9/00805* (2013.01); *G06K 9/6202* (2013.01); *G06T 7/0044* (2013.01); *G06T 15/10* (2013.01); *H04N 1/393* (2013.01); *G06T 2207/10004* (2013.01); *G06T 2207/20021* (2013.01); *G06T 2207/30201* (2013.01)

(58) Field of Classification Search
CPC .......... G06T 3/00; G06T 3/40; G06T 3/4007; G06T 7/004; G06T 7/0044; G06T 7/0079; G06T 7/0081; G06T 15/10; G06T 2207/10004; G06T 2207/20021; G06T 2207/30201; G06K 9/00221; G06K 9/00228; G06K 9/00261; G06K 9/00805; G06K 9/38; G06K 9/6202; H04N 1/3935; H04N 1/393
See application file for complete search history.

(56) References Cited

U.S. PATENT DOCUMENTS

| | | | | |
|---|---|---|---|---|
| 4,658,300 | A * | 4/1987 | Kawamura | H04N 1/3935 348/409.1 |
| 5,053,886 | A * | 10/1991 | Nakajima | H04N 1/3875 358/448 |
| 6,195,101 | B1 * | 2/2001 | Ghislain Bossut | G06T 11/60 345/629 |
| 6,658,145 | B1 * | 12/2003 | Silver | G06T 7/0046 348/125 |
| 6,775,411 | B2 * | 8/2004 | Sloan | G06K 9/3241 358/1.6 |
| 7,003,176 | B1 * | 2/2006 | Suzuki | G06T 3/4015 345/3.3 |
| 7,123,277 | B2 * | 10/2006 | Brown Elliott | G06T 3/4015 345/426 |
| 7,180,528 | B2 * | 2/2007 | Bossut | G06T 11/60 345/619 |
| 7,379,613 | B2 * | 5/2008 | Dowski, Jr. | G02B 27/0025 356/521 |
| 7,398,478 | B2 * | 7/2008 | Wu et al. | H04N 5/44543 345/645 |
| 7,583,859 | B2 * | 9/2009 | Suzuki | G06T 3/4015 345/660 |
| 7,688,335 | B2 * | 3/2010 | Brown Elliott | G06T 3/4015 345/426 |
| 8,169,656 | B2 * | 5/2012 | Kondo | G06T 3/4007 345/660 |
| 2015/0348246 | A1 * | 12/2015 | Lim | G06T 5/001 382/167 |

* cited by examiner

*Primary Examiner* — Manav Seth
(74) *Attorney, Agent, or Firm* — Lee & Hayes, PLLC

(57) ABSTRACT

Subject matter disclosed herein relates to arrangements and techniques that provide for identifying objects within an image such as the face position of a user of a portable electronic device. An application specific integrated circuit (ASIC) is configured to locate objects within images. The ASIC includes an image node configured to process an image and a search node configured to scale the image and search the scaled image for an object in the image. The ASIC also includes an ensemble node configured to confirm the presence of the object in the image. The ASIC is configured to convert scaling ratios from real-type numbers to integer-type numbers.

20 Claims, 12 Drawing Sheets

CONVERTING REAL-TYPE NUMBERS TO INTEGER-TYPE NUMBERS FOR SCALING IMAGES

BACKGROUND

Many portable or stationary electronic devices are becoming more complex and using various technologies for controlling the portable electronic devices as well as for providing various user functionality and interactions. The implementation of these complex technologies and the processing associated therewith can require a large amount of resources from the portable electronic device's application processor and/or central processing unit (CPU). Such processing requirements can result in slower performance by the portable electronic device, greater power requirements, and/or the need for larger and more powerful processors for the portable electronic device.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Figure 1:
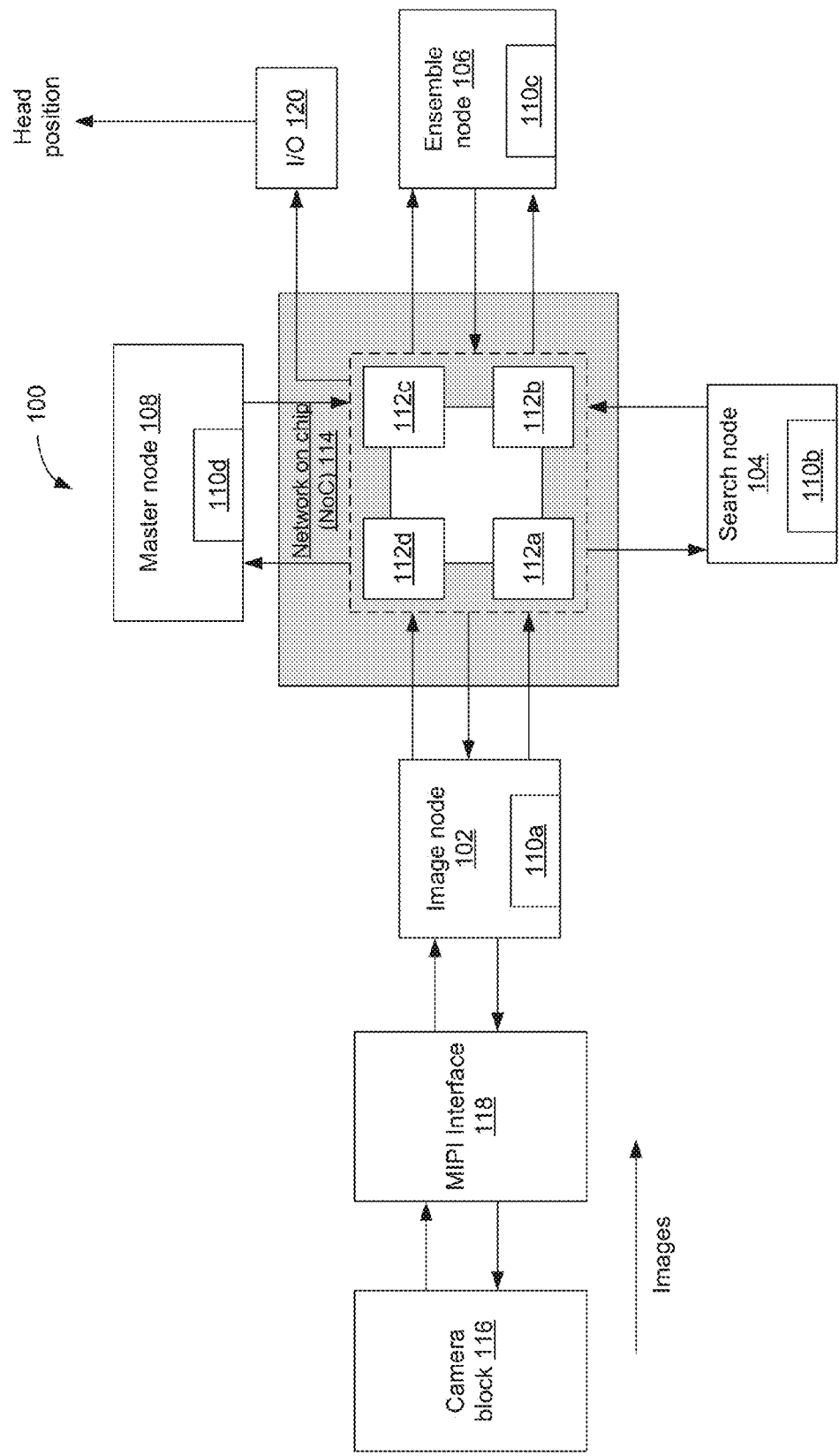
FIG. 1 schematically illustrates an Application Specific Integrated Circuit (ASIC), in accordance with various embodiments.

The present application provides arrangements and techniques for identifying objects within an image such as the face position of a user of a portable electronic device. In particular, the present disclosure provides an Application Specific Integrated Circuit (ASIC) that identifies the position of a user's face, verifies a position of the user's face and then provides the position of the user's face to the application processor (AP) of the portable electronic device for use by the AP. More particularly, the present disclosure provides an ASIC that converts scaling ratios from real-type numbers to integer-type numbers for scaling the image for searching the image for the position of the user's face.

A portable electronic device such as, for example, a smartphone, a tablet computing device, a notebook computing device, etc., generally displays content on a display. The content can include, for example, images, words, etc. Such content can be displayed to a user for viewing. When the user is ready to move on to further content, the user can "scroll" the content on the display to new content. Often, the user scrolls the content on the display via, for example, by contacting the display (e.g., a touchscreen display), or physical inputs such as a keyboard, a toggle switch, a mouse pad type device, etc. However, technology has now been developed and used to allow for the portable electronic device to recognize an image of a portion of the user and track that portion of the user for movement that can be used by the portable electronic device to signify a desire to scroll content displayed on the display of the portable electronic device. For example, an image of the position of a user's face can be tracked by cameras on the portable electronic device to thereby signify desired movement of scrolling of the content on the display. For example, the cameras may track the user's face to determine that the user's face is moving in an upward motion, thereby indicating that the user wishes the content on the display to scroll upward to provide further content on the display. Likewise, the cameras can track movement of the user's face in a downward or side-to-side movement to indicate a desire for the user to have content scrolled in a downward motion on the display or in a side-to-side motion. However, such processing requires a great deal of power and time on the part of the application processor for the portable electronic device.

In accordance with various embodiments, a Network on Chip (NoC) included with a portable electronic device connects three nodes of the ASIC for processing and identifying images corresponding to a position of a user's face. The ASIC includes an image node that receives images from four corner cameras. The four corner cameras are generally located in the four corners of a display of the portable electronic device. In accordance with various embodiments, only two of the four images are utilized by the image node since often, one or two of the cameras are occluded by the user's fingers. Furthermore, as will become apparent herein, only two images are generally needed for identifying a position of the user's face. The other two images, and thus a total of four images, can be utilized to calibrate the four corner cameras of the portable electronic device. The image node processes the two images so that the two images can be searched for a user's face. The processing can include exposure correction in the form of a black level correction, defective pixel correction, and a statistical analysis of the images.

Once the image node has processed the two images, generally a left image and a right image, the two images are forwarded to a search node. The search node generally scales the image down such that a minimum size of an object of interest, such as the user's face, can fit within a search window. The search node then searches for the user's face within a first image. Once the search node determines that it has found the user's face within a region of interest, the search node searches the second image in order to determine if the face can be found in a similar region of interest within the second image.

The search node will progressively search within the first image and will continue to scale the first image down such that a maximum size of the item of interest, such as the user's face, will fit within a search window. In accordance with various embodiments, the search node includes a cascade classifier that contains stages of Haar features that are trained to identify a particular object or pattern. The searching of the various regions within the images progresses through the various stages of the cascade classifier until either a stage fails, or a region of interest in the image passes all of the stages, thereby indicating the presence of an object such as the user's face. The downsizing and searching of the image continues until a location of the object within the image can be determined.

Once the search node has identified the presence of a face in both the right and left images, the image is sent to an ensemble node of the ASIC. The ensemble node is utilized to confirm the presence and size of the face in a region of interest in the first image and a corresponding region of interest in the second image. In accordance with various embodiments, a template is utilized by the ensemble node to compare, pixel-by-pixel, the region of interest in the first image and, pixel-by-pixel, the region of interest in the second image. If the ensemble node confirms the presence and size of a face in the two images, then the image of the face is sent back to the search node to extract facial features from the face. The features from the face are then forwarded to the application processor which will then analyze the features of the face to determine positions of the face in order to control the scrolling.

However, scaling of the images for searching the images and comparing the images with the template requires the use of scaling ratios. Selection of the scaling ratios can be random, which can result in scaling ratios being real-type numbers. In accordance with various embodiments, the ASIC does not support real-type numbers. In such embodiments, the ASIC converts the real-type numbers into integer-type numbers by multiplying the real-type numbers by a precision or conversion factor. In order to limit complexity of the conversion, in some embodiments, the ASIC is constrained to utilize a converted scaling ratio within a range.

FIG. 1 schematically illustrates an Application Specific Integrated Circuit (ASIC) 100 that includes four nodes 102, 104, 106 and 108. The four nodes 102, 104, 106 and 108 include an image node 102, a search node 104, an ensemble node 106 and a master node 108. The ASIC 100 includes four scaler Microprocessor without Interlocked Pipeline Stages (MIPS) cores 110*a, b, c* and *d* and four megabytes of internal memory 112*a, b, c* and *d*. In accordance with various embodiments, the internal memory 112 is static random access memory (SRAM). More or less memory may be included if desired. As can be seen, the four processor cores 110*a, b, c* and *d* are associated with one of the nodes 102, 104, 106 and 108, respectively.

The ASIC 100 further includes a Network-On-Chip (NoC) 114 that couples the nodes 102, 104, 106 and 108 together for sending and receiving messages among the nodes 102, 104, 106 and 108. As is known, a NoC is an emerging option for communications within large very large scale integration (VLSI) systems implemented on a single silicon chip. In a NoC system, modules such as processing cores, memories and specialized internet protocol (IP) blocks exchange data, instructions, etc. using a network as a "public transportation" sub-system for the information traffic. A NoC is generally constructed from multiple point-to-point data links interconnected by switches (also referred to as routers), such that messages can be relayed from any source module to any destination module over several links by making routing decisions at the switches. A NoC is similar to a modern telecommunications network, using digital bit-packet switching over multiplexed links. Although packet-switching is sometimes claimed as a necessity for a NoC, there are several NoC proposals utilizing circuit-switching techniques. The definition of a NoC based on routers is usually interpreted such that a single shared bus, a single crossbar switch or a point-to-point network are generally not NoCs but practically all other topologies are considered NoCs.

The master node 108, serves as "the command and control block" for the ASIC 100. The master node 108 is responsible for boot and power management, as well as controlling the three other MIPS processor cores 110*a, b* and *c* in the ASIC 100.

As can be seen, the image node 102 is in communication with the four corner cameras, represented by a camera block 116 via a Mobile Industry Processor Interface (MIPI) interface 118. A low speed input output (I/O) 120 is in communication with an application processor (not illustrated) of a portable electronic device (not illustrated) that includes the ASIC 100.

Figure 2:
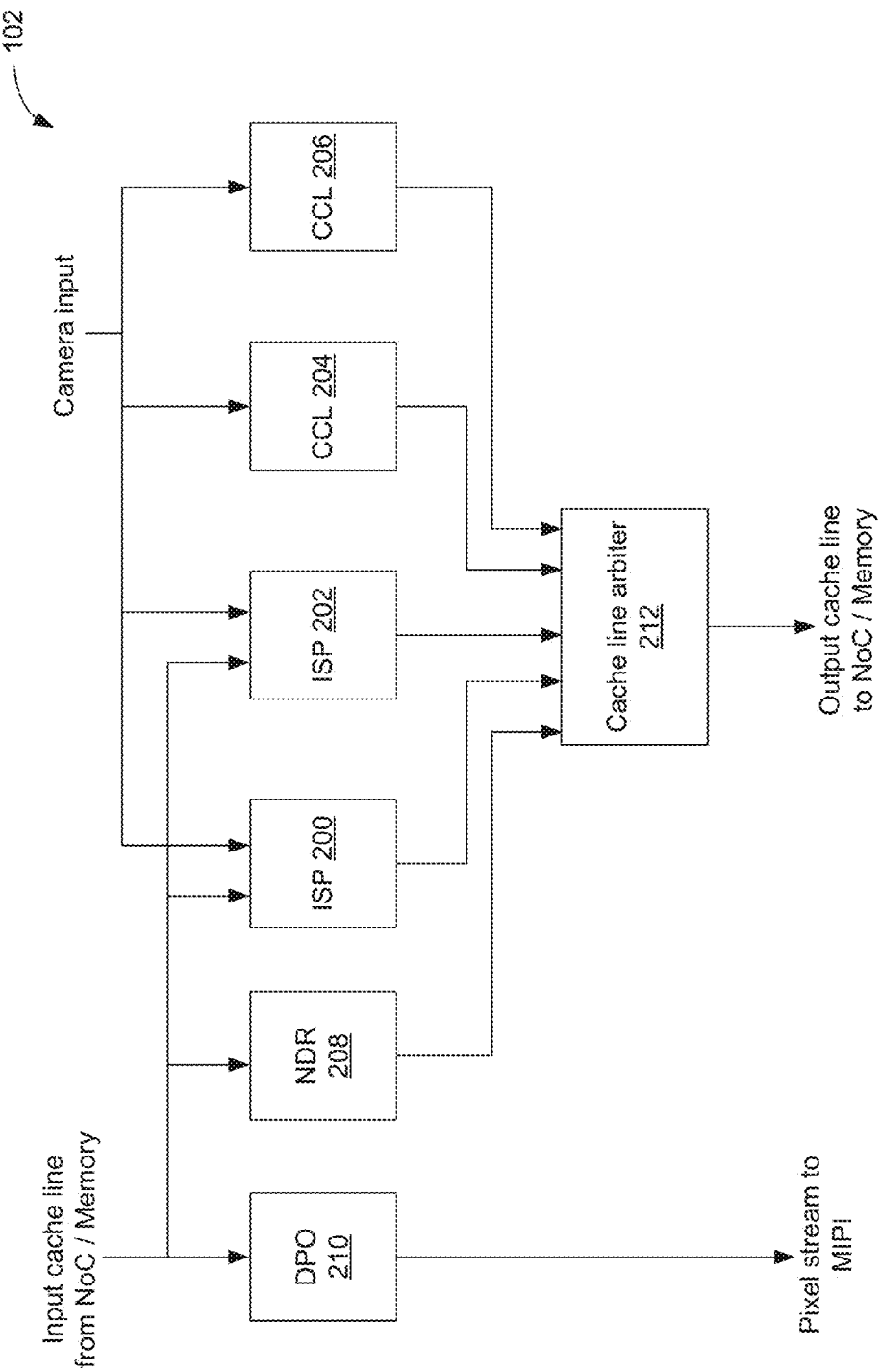
FIG. 2 schematically illustrates an image node of the ASIC of FIG. 1, in accordance with various embodiments.

FIG. 2 schematically illustrates the image node 102. The image node 102 includes two image sensor processors (ISP) 200, 202 and two camera calibration logic (CCL) 204, 206. The ISPs 200, 202 and the CCLs 204, 206 are in communication with the MIPI interface 116 that is in communication with the four corner cameras (camera block 114). The image node 102 also includes a 90 degree rotate (NDR) 208, and a debug port output (DPO) 210. The CCLs 204, 206 and the DPO 210 are utilized for calibration of the four corner cameras (in conjunction with the ISPs 200, 202). The calibration of the four corner cameras is performed by the AP and will not be discussed further herein. However, the calibration of the four corner cameras is important so that a relative position of a region of interest (ROI) in one camera translates to a maximally bounded corresponding ROI in another camera based on estimated z-depth. Specifically, the uncertainty in the size and position of the ROI in the second camera should be a function primarily of the uncertainty in the z-depth estimation and not the uncertainty of the two cameras in global coordinate space. The image node 102 also includes buffers (not illustrated). The image node 102 also includes a cache line arbiter 212.

The NDR 208 is utilized since often the user may be using the portable electronic device in a "landscape" mode. In such an instance, images arriving from the cameras may actually be on their sides. Thus, the NDR 208 can be utilized to rotate the images based upon an indication that the portable electronic device is being operated in a landscape mode. In accordance with various embodiments, the NDR 208 is configured to rotate the images 90 degrees, 180 degrees and 270 degrees.

Each ISP 200, 202 provides functionality that includes static and dynamic defective pixel detection and correction, black-level correction and gain control, and full and partial image statistical generation and analysis. Generally, the primary processing is to the camera exposure control. These are latency critical adjustments, so dedicated hardware is included to statistically analyze the full input images over one of several specified regions of interest (ROI) in the image. Camera adjustments can be based on the entire image or can be made to track ROIs corresponding to tracking or potential face positions. Local black level correction also facilities search retrying of images corrected based on different regions (if new images are not available yet due to low frame rate). The image statistical generation and analysis can be used for normalization of matching thresholds.

Generally, the ISPs 200, 202 receive a signal that a frame is coming in and then moves the frame through the ISPs 200, 202 to process the images. The processed images can then be written to memory 112a or can be provided to another node within the ASIC 100.

Figure 3:
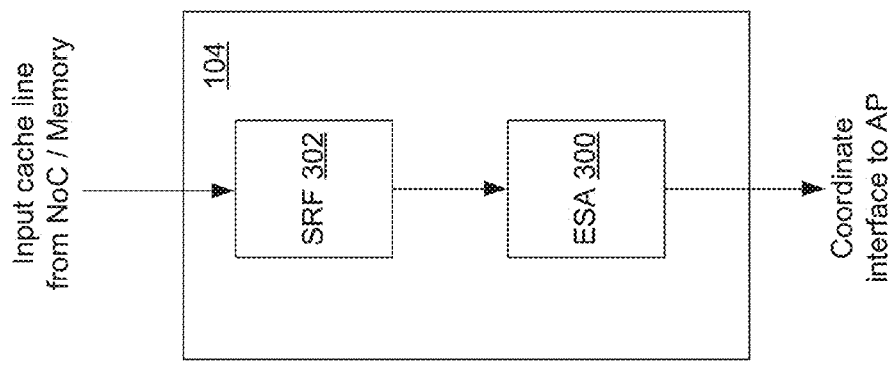
FIG. 3 schematically illustrates a search node of the ASIC of FIG. 1, in accordance with various embodiments.

FIG. 3 schematically illustrates the search node 104. The search node 104 includes an exhaustive search array unit (ESA) 300 and a scaling resample filter (SRF) 302. The ESA 300 and the SRF 302 are controlled by the MIPS core 110b.

The SRF 302 is designed to resample an image while downsizing it. In accordance with various embodiments, the SRF 302 is a six tap programmable scaler. The coefficients are programmable, so various types of filters can be implemented. In accordance with various embodiments, Lanczos resampling coefficients are used and the maximum downscale is approximately one-sixth.

Once the image is scaled down, the image is ready to be searched for objects. Search processing by the ESA 300 largely involves passing a search window over the image until the entire scaled image has been searched. An individual window is searched by applying and testing each stage of a cascade classifier until a stage fails or all stages are passed. If all stages pass, then an object is determined to have been found in the image and its coordinates and dimensions are saved. Generally, the process is then repeated for a second image related to the first image, i.e. the stereo image of the first image, to check if the object is also located at the same coordinates and with the same dimensions in the second image. Searching of the second image can also be done simultaneously with searching the first image if desired.

More particularly, it is possible to search a full size image, which in accordance with various embodiments, is approximately 400×400 pixels. However, the search window, in accordance with various embodiments, is generally 32×32 pixels. Other image sizes and search windows may be used if desired. Since a minimum size for an object, e.g., the user's face, may be, for example, 50×50, the image generally needs to be scaled down until the minimum size of the object fits within the 32×32 search window. Thus, the original 400×400 image is generally scaled down to 256×256. The entire image is searched by passing the search window over the scaled down image, generally beginning at location 0, 0 of the image. The scaled image is generally saved and if the initial searching passes the stages, then the image is further scaled down and searched until the image has been scaled down to a point that the maximum object size, e.g., 220×220 for a user's face, fits within a 32×32 search window. The image is scaled by a programmable factor with a default of 1.2 each iteration.

Generally, the SRF 302 is programmed with the default scaling ratio of 1.2. However, other scaling ratios may also be desired. It may also be desirable to randomly select different scaling ratios during various iterations of scaling and searching of the images. In various embodiments the scaling ratio may range between 0 and 6. Also, in various embodiments, the SRF 302 does not support processing of real-type numbers, e.g., 1.2, 3.7, etc. This may put a limitation on the scaling of the images thereby enabling only pre-calculated parameters to be used in the scaling. Accordingly, in accordance with various embodiments, the SRF 302 converts any real-type numbers to an integer-type number. In order to achieve this, a new parameter referred to as a "precision" factor or a conversion factor is introduced. As an example, 1.234 (real-type number) can be represented as 1234 (integer-type number). In this example, the conversion factor used is 1000. As can be seen, the integer-type value of the number is obtained by multiplying the conversion factor with the real-type value of the number (1.234×1,000=1,234).

Thus, if the input image has a dimension, such as height, of 400 pixels such that input_height=400 and the desired scaled image has a dimension, such as height, of 256 pixels such that output_height=256, then the scaling_ratio=256/400=0.64. Since in this example embodiment the SRF 302 does not support real-type numbers, the SRF 302 cannot use the scaling ratio of 0.64 since 0.64 is not an integer-type number. By utilizing a conversion factor, input_height=400, output_height=256 and conversion factor=100, then the scaling ratio=64. Now, the SRF 302 can work with this equation and generate an integer scaling ratio (64, in this example). The operating constraint or relationship for the SRF 302 is thereby input_height×scaling_ratio=output_height×conversion factor.

However, since real-type numbers are being generated for use as scaling ratios in this example embodiment (as opposed to integer-type numbers), the previously described scheme may not be adequate. For example, if output_height=300 and input_height=367, then the scaling_ratio is 0.81743869209809264305177111716621 . . . . In this example, if the precision is 1000000, even then the scaling ratio turns out to be 817438.69209809264305177111716621, which is still a real-type number. Hence, this example equation can never be solved to provide an integer-type number for use as a scaling ratio. This can cause a conflict for the SRF 302. Accordingly, in accordance with embodiments, the operating constraint for the SRF 302 includes another factor referred to as "range". Instead of the SRF 302 using exact values (i.e. using =), the operating constraint for the SRF 302 includes a range of integers such that the operating constraint for the SRF 302 becomes input_height×scaling_ratio=(output_height×conversion factor)+/−range. The SRF 302 can be coded into two operating constraints or relationships such that input_height×scaling_ratio is greater than or equal to (output_height×conversion factor)−range and input_height×scaling_ratio is less than or equal to (output_height×conversion factor)+range. Thus, the non-integer or fractional portion of the scaling ratio that has been multiplied by the conversion factor may be removed or dropped and a number (integer) from the range of integers may be added to or subtracted from the scaling ratio that has been multiplied by the conversion factor if desired to compensate for removal of the non-integer portion of the scaling ratio that has been multiplied by the conversion factor to provide further options for scaling. The number from the range can be automatically selected and may be random. Also, the image may be repeatedly scaled with different values from the range added to or subtracted from the scaling ratio that has been multiplied by the conversion factor.

In accordance with various embodiments, the range can be either dynamic or static. A static range is generally a static value, for example 100. A dynamic range may be, for example, a function of the conversion factor. For example, the range may equal the conversion factor divided by 10000. A dynamic range may be more beneficial than a static range in various embodiments since a dynamic range may not be too wide in size and a conversion factor may be chosen, for example, from 10 to 1,000,000,000 (any low value to any high value) without worrying about the range.

The example conversion factors previously described are multiples of 10. However, for ease of programming the SRF 302, the conversion factors may be multiples of 2. For example, if the fraction part of a scaling ratio needs to be stored in 16-bits, then a conversion factor equal to 2 to the 16th power (65536) may be used. This may also ensure that the rounding and truncating problem previously described may not occur and thus, the range may not be needed.

In embodiments, the SRF 302 performs the scaling utilizing scale_init and scale_step for both vertical and horizontal scaling, i.e. vert_scale_init and vert_scale_step for vertical scaling, and horiz scale_init and horiz scale_step for horizontal scaling. Scale_init represents the starting pixel and scale_step generally represents the scaling ratio. Thus, as an example, if the scaling ratio=1.2246, then scale_step=1.2246 and if the conversion factor=1,000,000, then the value of the integer-type number of the scale_step and scale_step_init=1224600. Accordingly, in an embodiment the conversion factor equals 1,000,000 for scaling ratios and for the fraction part of scale_init and scale_step, the SRF 302 may be programmed to use a conversion factor of 2 to the $16^{th}$ power (65536). Other values may be used depending upon the application and desired results. Accordingly, various random scaling ratios may be used as desired. Additionally, the concepts described herein may be used with other types of devices that do not support processing of real-type numbers. Generally, conversion factors and ranges may be selected for inclusion in the ASIC 100 based upon desired levels of precision and applications to be executed by the ASIC 100.

The search implementation in the search node 104 utilizes Haar Evaluator type features based upon the Viola-Jones algorithm. The Haar features are combinations of 2 or 3 rectangular shapes. These shapes can be compared and tested against a threshold, and this yields useful information regarding the presence of a face or facial features in the current search window. Generally the Haar features and the Viola-Jones algorithm are very efficient at indicating when an object is not present within an image. The rectangular shapes of the Haar features are computed by adding up pixel values of all of the pixels in the given rectangle. This can generally be accomplished very quickly for any arbitrarily sized rectangle if an "integral image" of a given input image is computed ahead of time.

Figures 4A, 4B:
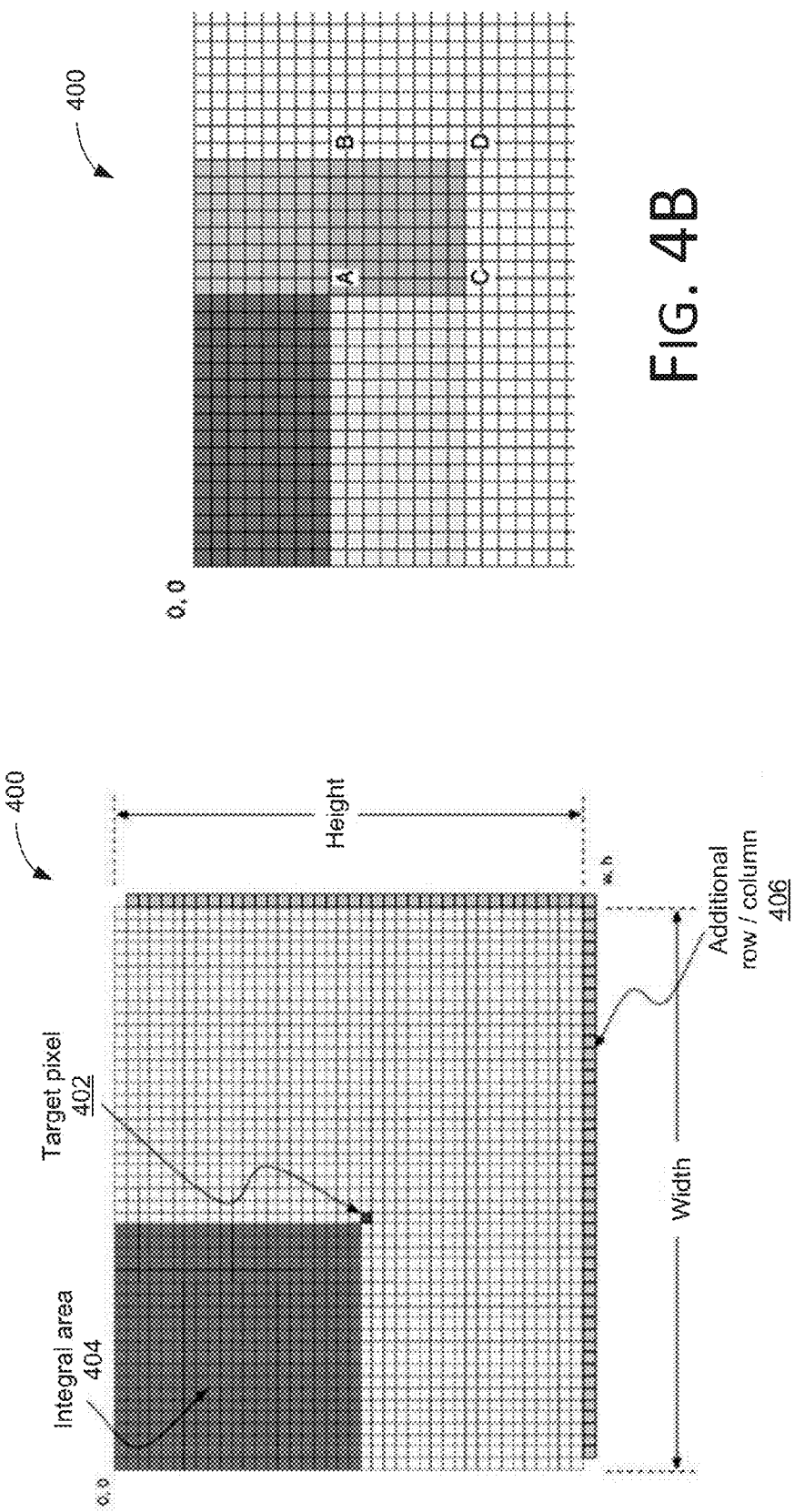
FIGS. 4A and 4B schematically illustrate integral images for pixels of an image.

As is known, in order to create an integral image, each pixel is assigned a value e.g. an al image pixel value, that is equivalent to the sum of all the pixels to the upper left of the location of the pixel. More particularly, the integral image is a version of the input image where each pixel is replaced by the value of all of the pixels to the left and above the given pixel location in the input image. Thus, as can be seen in FIG. 4A, a target pixel 402 of an image 400 is assigned a value equal to all of the pixels in the integral area 404. Note that the integral image is one pixel wider and higher than the input image (additional row/column 406). Further note that the pixel at location [w, h] contains the total of all of the pixels in the entire image 400.

Figure 5:
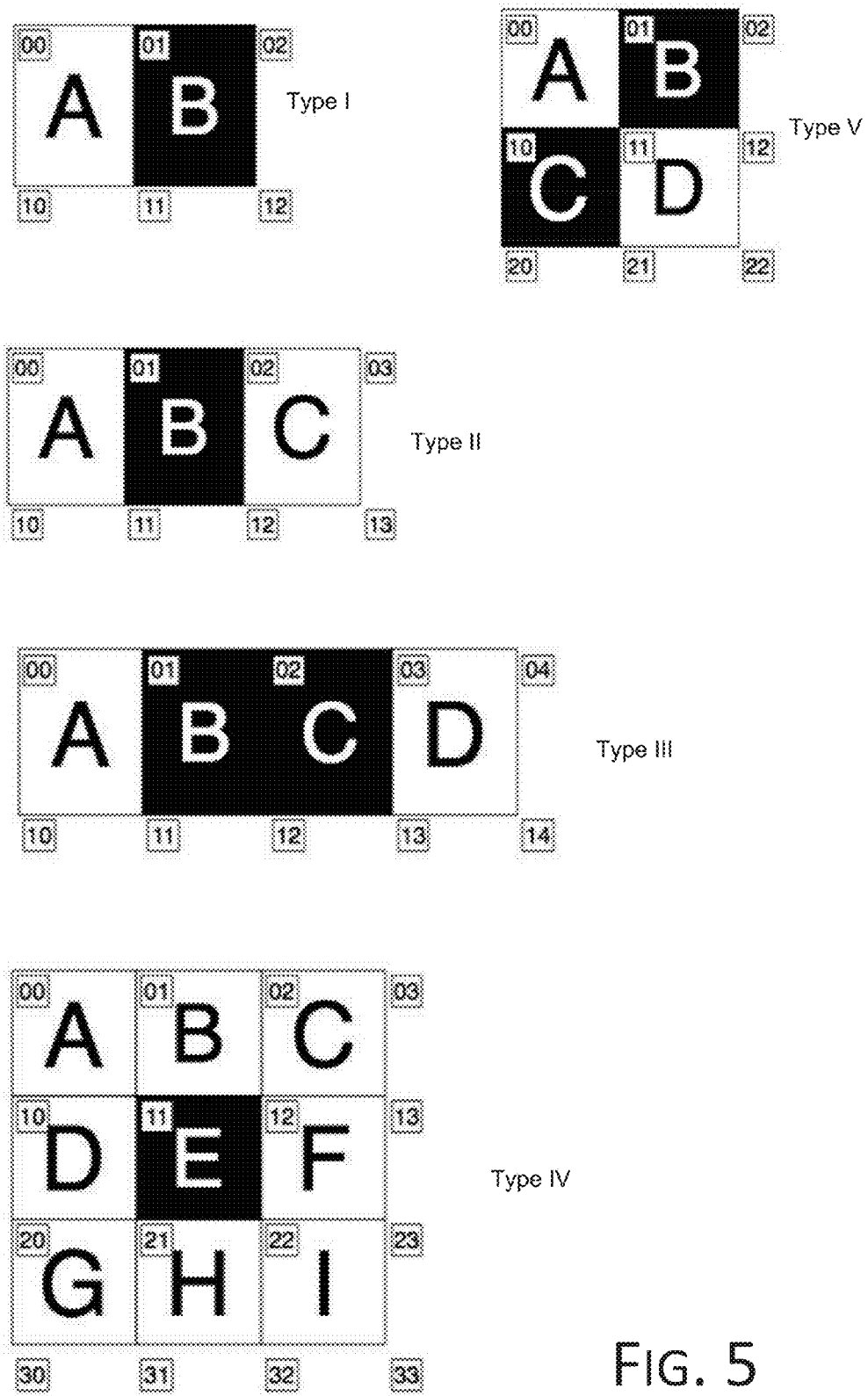
FIG. 5 schematically illustrates examples of Haar features that are used with an exhaustive search array of the search node of FIG. 3.

Referring to FIG. 4B, given an integral image, the pixel total of any rectangle in an image can be quickly computed by adding and subtracting the integral images (II) of the four pixels at the corners A, B, C and D of the rectangle. However, it can be seen in FIG. 5 that when integral image pixels B and C are subtracted from integral image pixel D, the integral image pixel A is subtracted off twice. Thus, the area is given by: Rect(A,B,C,D)·area=II(D)−II(C)−II(B)+II(A).

Figure 6:
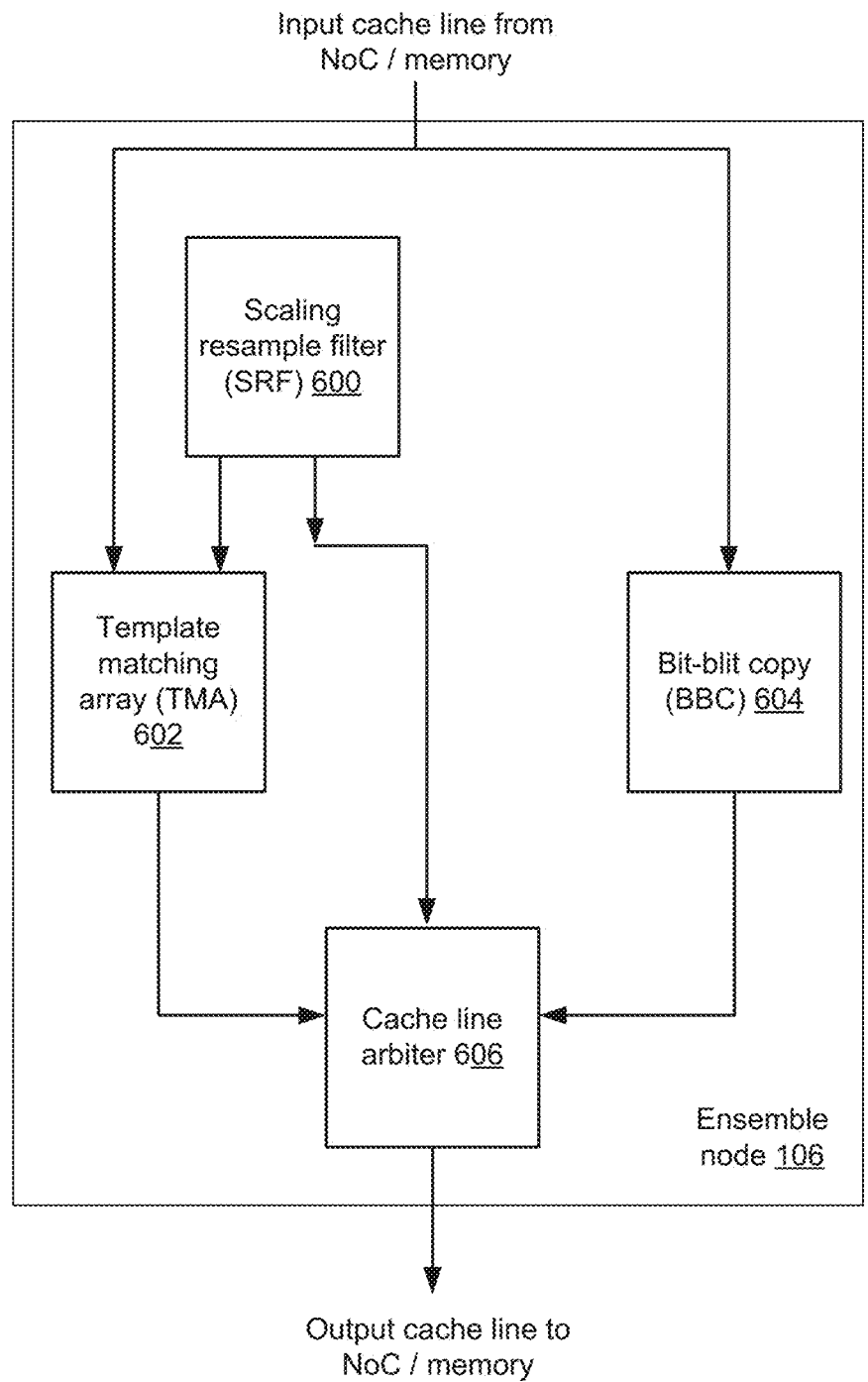
FIG. 6 schematically illustrates an ensemble node of the ASIC of FIG. 1, in accordance with various embodiments.

FIG. 6 schematically illustrates the ensemble node 106. The ensemble node 106 augments the search node 104. The initial search from the search node 104 can be equated to finding a Region of Interest (ROI). The ensemble node 106 accelerates post-search tasks such as stereo association and primary face selection or temporal association.

Even when the search node 104 initially appears to produce a strong detection by finding a face in both the left and right stereo images, such a finding still needs to be confirmed. It is confirmed by comparing that the position and size of a face found in one image has a corresponding face of the appropriate size and position in the other stereo image of the pair of images. If there are multiple faces in the frame the ensemble node creates a depth map of any faces found in the images and selects the face closest to the cameras as the face to track. Furthermore, histories of previously found face templates are retained in order to distinguish a primary user from other faces found in the image. Once the primary face has been found, the ensemble node 106 sends the face back to the search node 104 to extract the features from the face. The ensemble node then sends the features and X, Y, Z coordinates of the location of the face to the application processor (not illustrated).

The ensemble node 106 is primarily designed to compare a face found in one image to an area of interest in another spatially or temporally related image. The ensemble node 106 includes a mechanism for comparing a small area of one image to a somewhat larger area of another image. The small image is generally referred to as a template, and the act of comparison is referred to as template matching. The ensemble node 106 compares pixel values of the images with pixel values of the template.

The ensemble node 106 includes a SRF 600 that is identical to the SRF 302 of the search node 104, including the ability to convert real-type numbers to integer-type numbers as described herein. The scaling ratios and/or conversion factors and/or ranges used by the SRF 600 may be the same as those used by the SRF 302 or may be different than those used by the SRF 302. The ensemble node 106 further includes a template matching array (TMA) 602, a Bit-Blit Copy (BBC) 604 and a cache line arbiter 606.

The SRF 600 can be used independently or it can be configured to feed scaled images directly into the TMA 602. Once matches are found by the TMA 602, the ensemble node 106 needs to organize the information by moving templates or pieces of images around. These pieces of images are referred to as "bit-blits." The bit-blits are moved around by the BBC 604. The BBC 604 is dedicated hardware support for copying sub-frame windows of pixels from one location to another. A common example is the retention of the most recent 10 matching face templates used by the TMA 602.

Figure 7:
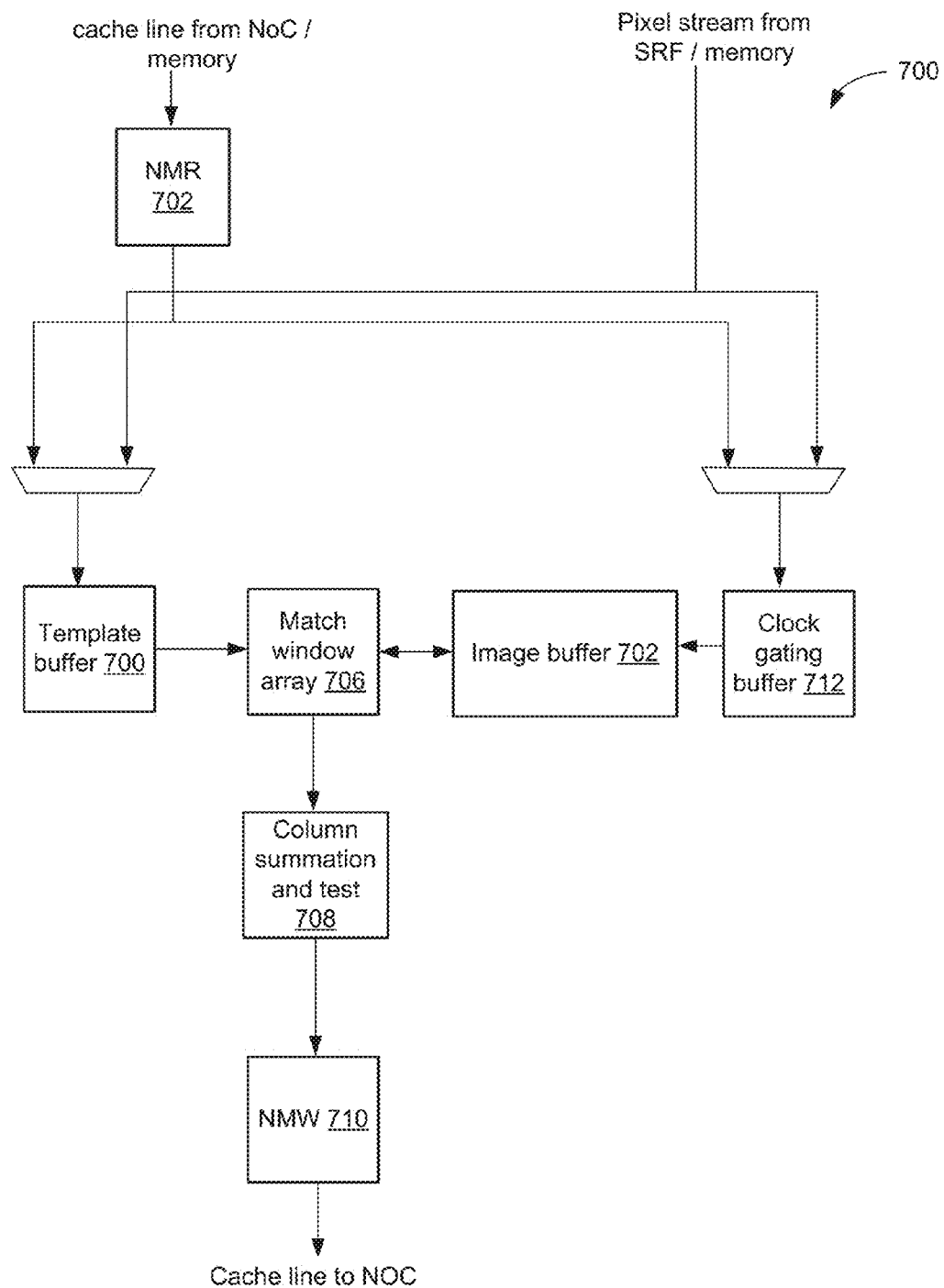
FIG. 7 schematically illustrates a template matching array of the ensemble node of FIG. 6, in accordance with various embodiments.

FIG. 7 schematically illustrates the TMA 602. As can be seen, the TMA 602 is largely comprised of a 2D register array/line buffer structure similar to the ISPs 200, 202 and the ESA 300. In the TMA 602, a parallel buffer 700 is used to store a current template. The template buffer receives a template from a NoC memory read (NMR) block 702. The template is a 32×32 template of pixel values for comparison with the ROIs in the images from the search node 104 and can either be a previous template stored in memory or can be based upon one of the two images where an object was found in the ROIs by the search node 104.

The template buffer 700 and an image buffer 704 both feed the 2D match window array 706 where partial comparison data is generated. The comparison data is partial because it is only summed over each row in the 2D window. A column of row results are output from the 2D window once every pixel cycle after the template has been completely circulated the first time.

Each partial result column is passed to a column summation and test block 708 where the column is processed into a pixel locations complete template matching result. The comparison result pixel is passed to a NoC memory write (NMW) block 710 for assembly into cache lines and output to the NoC, i.e. memory 112b or 112c. Each of the matching result pixels is tested to find a minimum or maximum value across the image. There are multiple types of matching methods that can be specified. Some of the methods indicate a best match as the minimum pixel result and other methods indicate a best match by a maximum result pixel value.

The TMA 802 will only start generating comparison pixel output once a full template is loaded into the template buffer 700. However, the TMA 802 can proceed to load the image buffer 702 until the full template is loaded. The image pixels can be loaded from the SRF 800 or from memory 112*b*. A clock gating buffer 712 controls the loading of the image pixels into the image buffer 702.

Table 1 below provides examples of comparison methods that can be used by the match window array 706.

TABLE 1

| Method | Best Match | Description |
| --- | --- | --- |
| SQDIFF | Min | Simple square of the differences |
| SQDIFF_NORM | Min | Simple square of the differences w/ normalization |
| CCORR | Max | Cross correlation |
| CCORR_NORM | Max | Cross correlation w/ normalization |

In accordance with various embodiments, the comparison pixel result pixel values produced by the comparison methods are normalized by dividing the comparison result by the square root of the product of the sum of template pixels squared and the sum of the image pixels that are covered by the template squared. More particularly, the normalization of any of the pixel results can be computed by multiplying it by the normalization value:

$$N = \frac{1}{\sqrt{\sum_{x',y'} T(x',y')^2 \cdot \sum_{x',y'} I(x+x',y+y')^2}}$$

where T represents the template, I represents the current image, x' represents the pixel values of the range of the x positions of the 32×32 template and y' represents the pixel values of the range of the y positions of the 32×32 template.

If the comparison pixel result values were not multiplied by the normalization factor N, then the match window array 706 would need to scale the current image multiple times to account for different contrasts. Thus, the match window array 706 includes adders and multipliers (not illustrated) to compute the sum of template pixels ($\Sigma_{x',y'}T(x',y')^2$), and the sum of the image pixels ($\Sigma_{x',y'}I(x+x',y+y')^2$). The match window array 706 also includes adders and multipliers (not illustrated) to compute an inverse square root. In accordance with various embodiments, the inverse square root is calculated using a Taylor Series Expansion.

Each of the 2D match array taps in the match window array 706 is a standalone computational engine capable of calculating a partial comparison result. The physical micro-architecture is sensitive to the large number of such computational elements.

In accordance with various embodiments, the match window array 706 performs the comparison using a multi-pass strategy, which utilizes less power. A full 32×32 match is still supported, but the match window array 706 actually implements the comparison as two passes through a 32×16 array. Each computational engine is now shared by 4-pixel comparison, so the physical array is actually an array 8-engines wide and 16-engines tall where each engine handles a 1-row of 4-pixels. Thus, four cycles are utilized to compare the entire 32 pixel image width during each of the two passes.

Figure 8A:
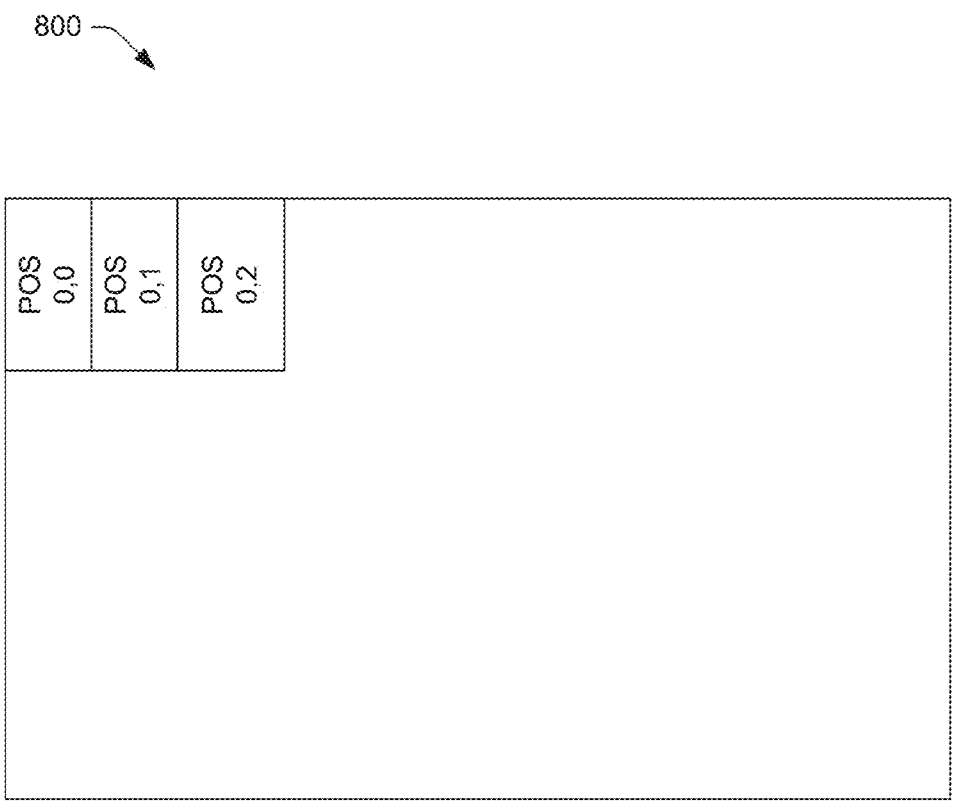
FIG. 8A schematically illustrates a template within an image, in accordance with various embodiments.

For example, referring to FIG. 8A, for searching a template of 32 by 32 pixels within an image 800 of 400 pixels by 400 pixels, position 0,0 is a 32 by 32 comparison done at the first position of the image. Then the search window is moved by 1 pixel to the right and the same 32 by 32 comparison is performed at position 0,1, and so on. The goal is to find the position that matches the 32 by 32 template the most.

Figure 8B:
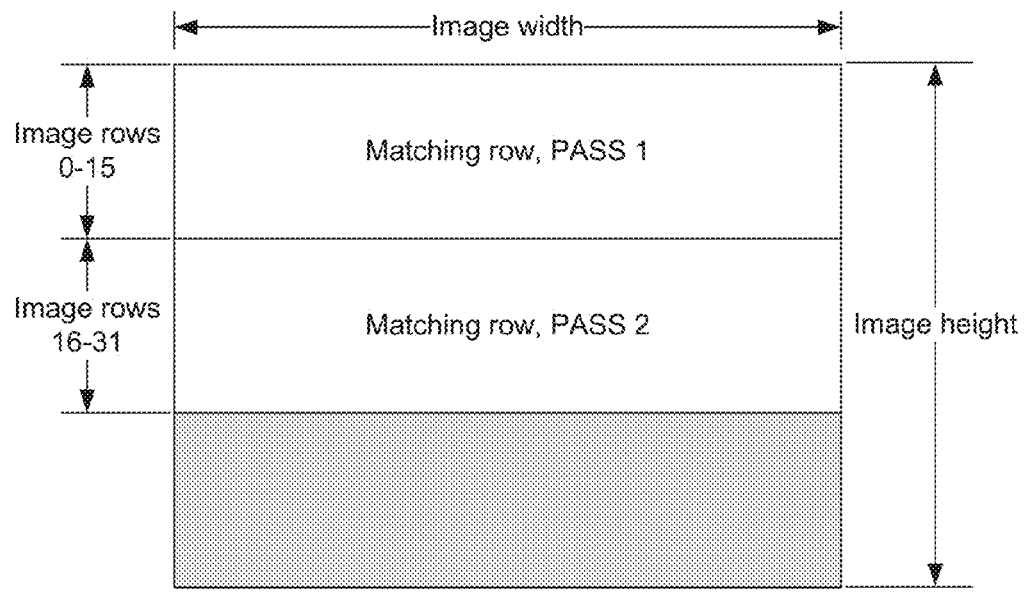
FIGS. 8B and 8C schematically illustrate line buffers of the template matching array of FIG. 7, in accordance with various embodiments.

Referring to FIG. 8B, it can be seen that the line buffers still contain a full template height of 32 image rows, but they are read out only 16 rows at a time. The partial results of the image comparison and the image summation are both saved from pass 1 and compressed into pass 2. Once matching row 0 has been fully compared, the top image row can be discarded from the line buffers and matching row 1 can then begin processing, as illustrated in FIG. 8C.

Figure 8C:
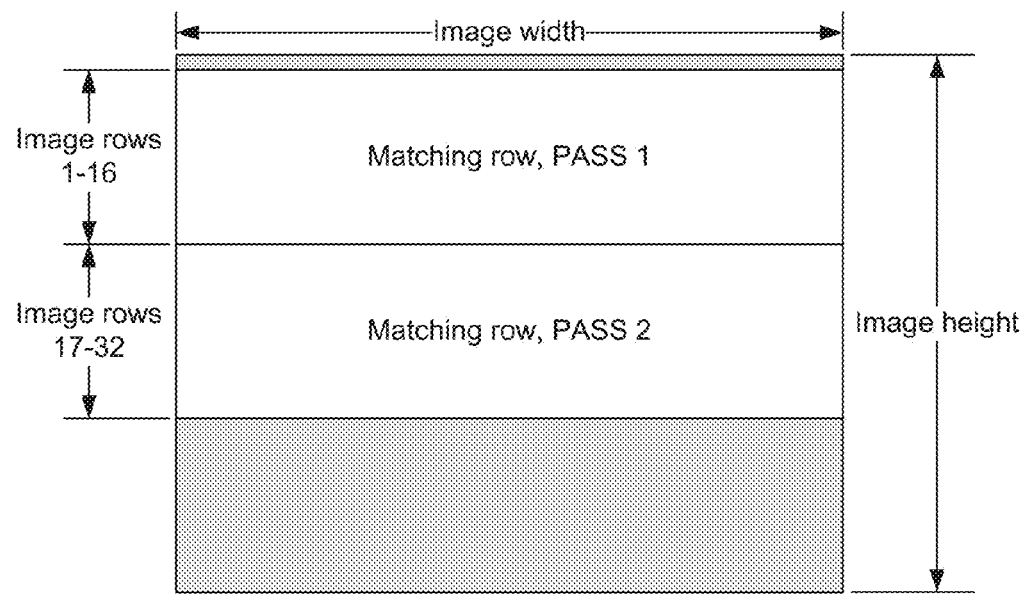
Figure 9:
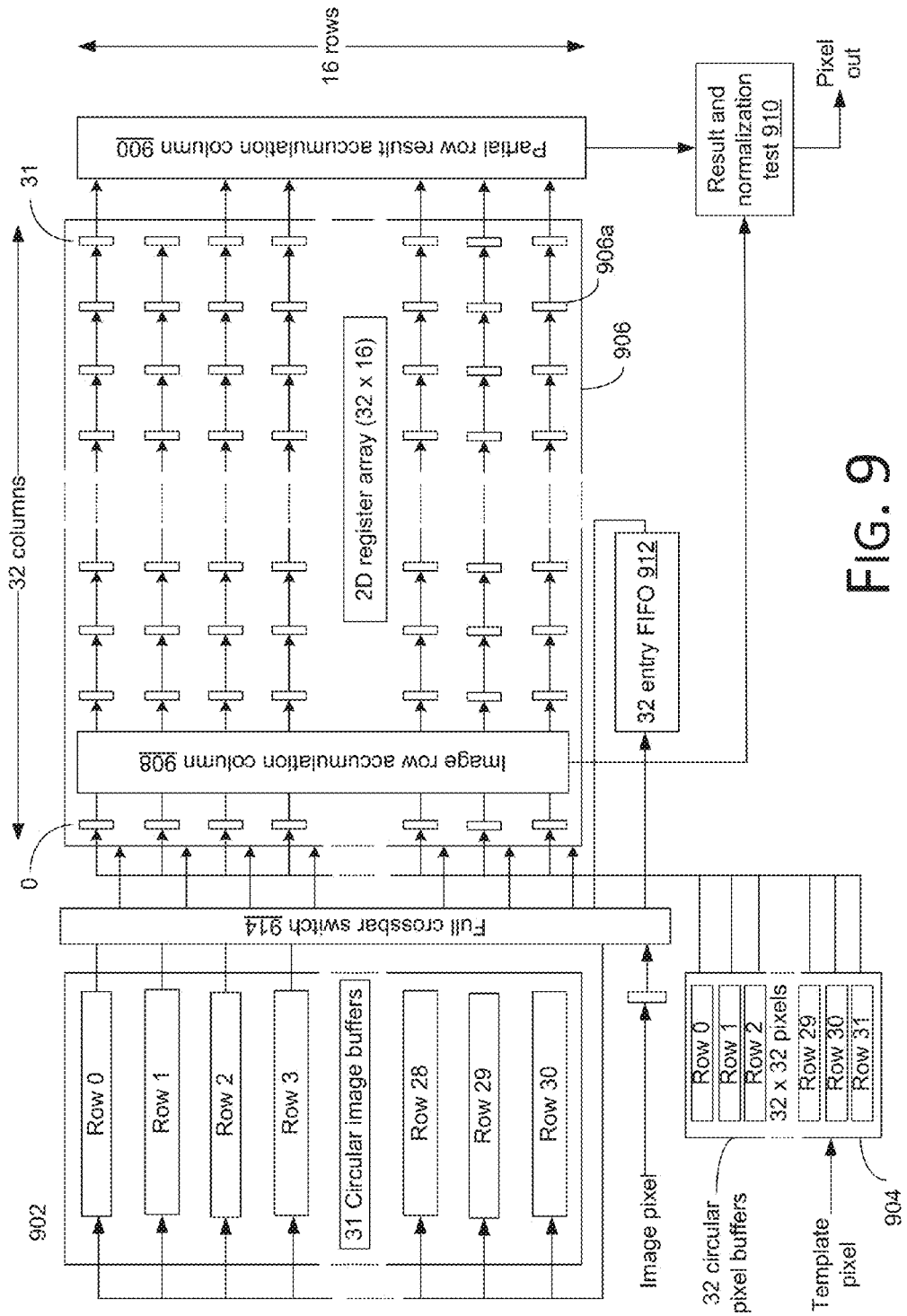
FIG. 9 schematically illustrates a match window array of the template matching array of FIG. 7, in accordance with various embodiments.

Referring to FIG. 9, which schematically illustrates the match window array 706, the partial comparison results for each pixel result from pass 1 in FIGS. 8B and 8C are saved into a dedicated line buffer 900. If normalization is active, then the partial image summation results for each pixel are also saved into an additional dedicated line buffer (not illustrated). These saved partial results are then read by the second pass and compressed into its partial results before being written back into the dedicated line buffer(s). The results of the $2^{nd}$ pass are final results and can proceed to the normalization and final result computation.

As previously noted, the match window array 906 is an array of small computational engines in the form of accumulators, as well as logic necessary to feed the computational engines operands to work on. The operands are a 2D image and a smaller 2D template, and each are stored in arrays of circular row buffers 902, 904. The circular row buffers 902, 904 work very similarly to the ISPs 200, 202 and ESA 300. Specifically, the image buffers 902 provide access to the complete subset of 32×32 sub-images present in the original image starting at the top left hand corner of the original image and proceeding in raster order through to the bottom right hand corner of the original image. Every pixel cycle the left column of the array is dropped and a new right column is added, so the 32×32 sub-image (or more accurately the 32×16 sub-image) is only valid in the array for a single pixel cycle.

The template is assumed to be loaded into the circular row buffers 904 before the image is loaded into the circular row buffers 902, so the template's top 16 rows of pixels can be preloaded into a computational array 906 made up of the computational engines 906*a*. The 16 rows of pixels are shifted in from array column 0 (on the left) toward array column 31 (on the right). Once in place, the template pixels are static for the entire 32×16 comparison. The image enters the computational array 906 much differently. The image is presented to the computational array 906 one column of image data at a time, and the column of image data is provided to every column in the computational array 906 simultaneously.

On the first cycle that the computational array 906 is completely filled with template pixels, the first column of the image (i.e. column 0) is compared across all of the columns of the computational array 906. The first column of the image is only compared to the first column of the template and when the image column gets equal to or larger than the template width, the image pixel will be used in all 32-partial comparison results in parallel.

Each image column is sequenced through and presented to the computational array 906. Note that the number of comparisons an individual image pixel is used in tapers down as the right edge of the image is approached. In fact the right most image pixel is just like the left in that it is also only used in a single template comparison. This is the reason the template is shifted into the computational array 906 from left to right rather than the more familiar raster order. The next 16 template pixel rows can enter the array directly behind the last value accumulator for the current 16 rows as the last value accumulator shifts out. However, there is some flexibility because as long as template column 0 is valid, the next 16 rows can start the first accumulation directly behind the current 16 rows.

The rows of the computational array 906 generally do not interact except in two places—the partial row result accumulation column 900 and an image row accumulation column 908. The partial row result accumulation column 900 and the image row accumulation column 908 are both specially designed columns that are used to aggregate the accumulated row results and combine them into a single result.

The rows of the computational array 906 operate independent of each other for the most part until a sub-image row result is complete. When ready, the column where the sub-image row exists is selected to enter the partial row image accumulation column 900. The partial row image accumulation column 900's primary function is to sum all of the row accumulate results into a final accumulated result and deliver it to a result normalization and formatting block 910.

The top three partial row results are accumulated into redundant binary, i.e. carry/save, by a full adder vector. This initial 3:2 is followed by another 3:2 for each additional row that is accumulated for a total of 14-each 3:2 stages. The final 3:2 (in row 15) is followed by a full carry propagation adder (CPA), which is used to compute the final column result.

The image accumulation column 908 is generally more complicated than the partial row result accumulation column 900 because it also accumulates each row result first. A computational engine is necessary to compute the image accumulation for each row. This computational engine will serve to calculate the sum-of-squares (SoS) for the template, the first 48×48 sub-image in the image row, and then each subsequent 32×32 sub-image in the row. In order to share hardware between the template SoS and the many sub-image SoSs, the template is loaded first into the template buffers 904 and the template's SoS can be calculated while the image is still being read into the image buffers 902. The TMA 802 will need to sequence all of the template columns through the match window array 906 once before matching starts in order to compute the template SoS. Note that an accumulator (not illustrated) can be used to retain the accumulated results from the rows 0-15. Template rows 16-31 will simply accumulate with row 0-15 before the individual row accumulators are summed down the column.

The first sub-image in any given image row is calculated much differently than each subsequent sub-image. The first in the row is calculated directly. Specifically, each image pixel is read in, squared, and accumulated with all of the previous pixels in the row. Normally, it would be necessary to retain 31 other partial results in parallel with this first accumulation, but since it is a running total, once the first 32 pixel row result is ready, the next result can be calculated by accumulating in the next squared pixel value (as normal), but also by subtracting the squared pixel value that is being removed from the left edge of the match window array 906 being fed from the right edge of the match window array 906 by the image buffer 902.

A 32-entry FIFO 912 is provided for the image pixel input row 31 since image pixel input row 31 does not require a line buffer. A second read from the line buffers is an option for the other 31 rows because the other 31 rows are only read every 4 cycles. A full crossbar switch 914 is provided for controlling loading from the circular image buffers 902 into the computational array 906.

The result provided by the match window array 906 requires normalization if a normalized comparison method is selected for use. The normalization requires the SoS for both the template and each individual 32×32 sub-image. The template SoS is computed (as the image is still being read in from memory) and saved for the remainder of the frame in a holding register. Once the first image accumulation column result arrives, it is multiplied by the saved SoS resulting in a 52-bit fixed-point result (assuming 32×32). The result has been computed to full accuracy (no rounding or truncation) and then converted to "statistically unbiased round to nearest" in accordance with IEEE 754.

Once the result has been computed and the presence of an object, i.e. a user's face, has been confirmed, the image can be sent to the search node 104 to extract facial features from the image. The final result is a position of the object, i.e. the user's face, given by X, Y and Z coordinates. The position of the user's face is relative to the center between the user's eyes. The coordinates are provided to an application processor, central processing unit, etc. of a portable electronic device that includes the ASIC 100.

Figure 10:
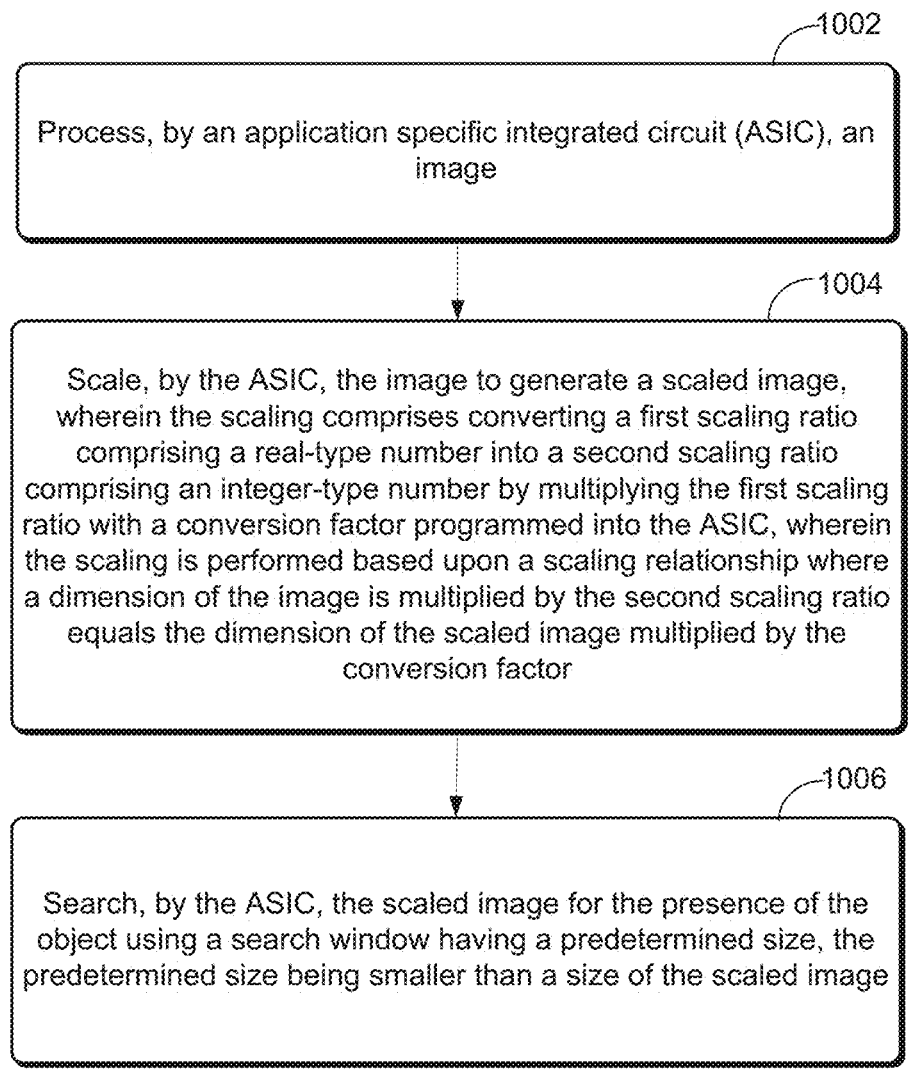
FIG. 10 is a flowchart illustrating an example of a process of searching for an object in an image with a scaling ratio converted from a real-type number to an integer-type number using the ASIC of FIG. 1, in accordance with various embodiments.

FIG. 10 is a flowchart illustrating an example of a process 1000 of a method of searching for an object in an image with a scaling ratio converted from a real-type number to an integer-type number using an ASIC, for example the ASIC 100, in accordance with various embodiments. At 1002, an Application Specific Integrated Circuit (ASIC) processes an image. At 1004, the ASIC scales the image to generate a scaled image. The scaling comprises converting a first scaling ratio comprising a real-type number into a second scaling ratio comprising an integer-type number by multiplying the first scaling ratio with a conversion factor programmed into the ASIC to generate the second scaling ratio, wherein the scaling is performed based upon a scaling relationship where a dimension of the image multiplied by the second scaling ratio equals the dimension of the scaled image multiplied by the first conversion factor. At 1006, the ASIC searches the scaled image for the presence of the object using a search window having a predetermined size, the predetermined size being smaller than a size of the scaled image.

Figure 11:
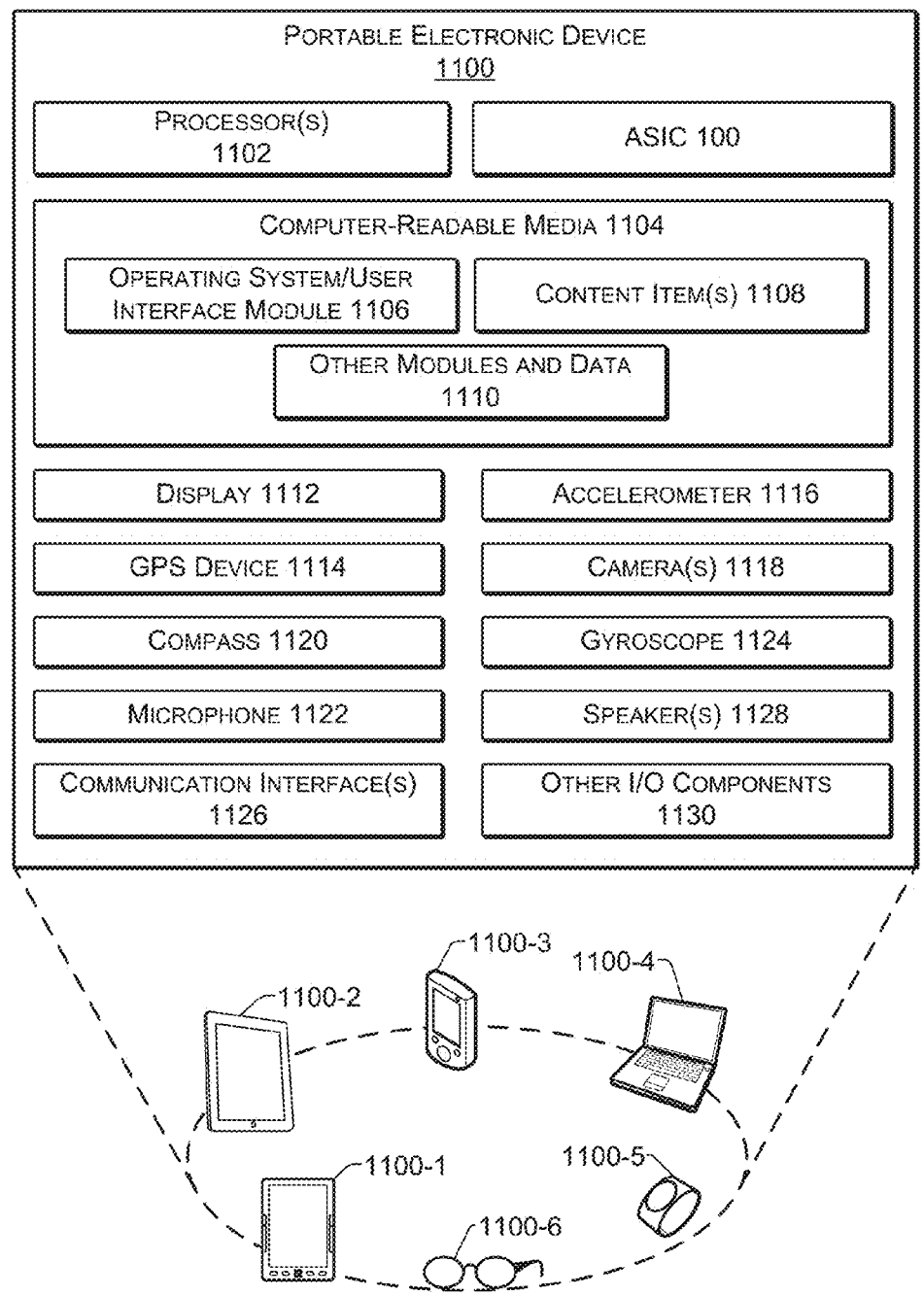
FIG. 11 illustrates select components of an example portable electronic device that includes the ASIC of FIG. 1, in accordance with various embodiments.

FIG. 11 illustrates select example components of an example portable electronic device 1100 that includes an ASIC 100 as described herein. The portable electronic device 1100 may be implemented as any of a number of different types of electronic devices. Some examples of the portable electronic device 1100 may include digital media devices and eBook readers 1100-1; tablet computing devices 1100-2; smartphones, mobile devices and portable gaming systems 1100-3; laptop and netbook computing devices 1100-4; wearable computing devices 1100-5; augmented reality devices, helmets, goggles or glasses 1100-6; etc. This list is only an example and is not meant to be limiting.

In a very basic configuration, the portable electronic device 1100 includes, or accesses, components such as at least one control logic circuit, central processing unit, application processor, or processor 1102, and one or more computer-readable media 1104. Each processor 1102 may itself comprise one or more processors or processing cores. For example, the processor 1102 can be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or configured to execute the algorithms and processes described herein. The processor 1102 can be configured to fetch and execute computer-readable instructions stored in the computer-readable media 1104 or other computer-readable media.

Depending on the configuration of the portable electronic device 1100, the computer-readable media 1104 may be an example of tangible non-transitory computer storage media and may include volatile and nonvolatile memory and/or removable and non-removable media implemented in any type of technology for storage of information such as computer-readable instructions, data structures, program modules or other data. The computer-readable media 1104 may include, but is not limited to, RAM, ROM, EEPROM, flash memory or other computer-readable media technology, CD-ROM, digital versatile disks (DVD) or other optical storage, magnetic cassettes, magnetic tape, solid-state storage and/or magnetic disk storage. Further, in some cases, the portable electronic device 1100 may access external storage, such as RAID storage systems, storage arrays, network attached storage, storage area networks, cloud storage, or any other medium that can be used to store information and that can be accessed by the processor 1102 directly or through another computing device or network. Accordingly, the computer-readable media 1104 may be computer storage media able to store instructions, modules or components that may be executed by the processor 1102.

The computer-readable media 1104 may be used to store and maintain any number of functional components that are executable by the processor 1102. In some implementations, these functional components comprise instructions or programs that are executable by the processor 1102 and that, when executed, implement operational logic for performing some actions described herein. Functional components of the portable electronic device 1100 stored in the computer-readable media 1104 may include an operating system/user interface module 1106 for controlling and managing various functions of the portable electronic device 1100.

In addition, the computer-readable media 1104 may also store data, data structures and the like, that are used by the functional components. For example, data stored by the computer-readable media 1104 may include user information and, optionally, one or more content items 1108. Depending on the type of the portable electronic device 1100, the computer-readable media 1104 may also optionally include other functional components and data, such as other modules and data 1110, which may include programs, drivers and so forth, and the data used by the functional components. Further, the portable electronic device 1100 may include many other logical, programmatic and physical components, of which those described are merely examples that are related to the discussion herein. Further, while the figures illustrate the functional components and data of the portable electronic device 1100 as being present on the portable electronic device 1100 and executed by the processor 1102 on the portable electronic device 1100, it is to be appreciated that these components and/or data may be distributed across different computing devices and locations in any manner.

FIG. 11 further illustrates other components of the example of the portable electronic device 1100. Such examples include a display 1112 and various types of sensors, which may include a GPS device 1114, an accelerometer 1116, one or more cameras 1118, a compass 1120, a microphone 1122, a gyroscope 1124, and so forth. In accordance with various embodiments, the portable electronic device includes at least four corner cameras located at corners and/or edges of the display 1112.

The portable electronic device 1100 may further include one or more communication interfaces 1126, which may support both wired and wireless connection to various networks, such as cellular networks, radio, Wi-Fi networks, close-range wireless connections, near-field connections, infrared signals, local area networks, wide area networks, the Internet, and so forth. The communication interfaces 1126 may further allow a user to access storage on or through another device, such as a remote computing device, a network attached storage device, cloud storage, or the like.

The portable electronic device 1100 may further be equipped with one or more speakers 1128 and various other input/output (I/O) components 1130. Such I/O components 1130 may include a touchscreen and various user controls (e.g., buttons, a joystick, a keyboard, a keypad, etc.), a haptic or tactile output device, connection ports, physical condition sensors, and so forth. For example, the operating system 1106 of the portable electronic device 1100 may include suitable drivers configured to accept input from a keypad, keyboard, or other user controls and devices included as the I/O components 1130. The display 1112 may be configured as a touchscreen or the portable electronic device 1100 may include a separate touchscreen. The processor 1102 can perform one or more functions attributed to a graphic controller (not illustrated) for the display 1112. Functional components of the portable electronic device 1100 stored in the computer-readable media 1104 may include the user interface module 1106 for controlling and managing various functions of the portable electronic device 1100, and for generating one or more user interfaces on the display 1112 of the portable electronic device 1100. Additionally, the portable electronic device 1100 may include various other components that are not illustrated, examples of which include removable storage, a power source, such as a battery and power control unit, a PC Card component, and so forth.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these program modules and techniques may be stored on computer storage media or transmitted across some form of communication.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. An Application Specific Integrated Circuit (ASIC) comprising:
    an image node configured to process an input image by (i) detecting and correcting defective pixels of the input image, (ii) correcting black-levels within the input image and (iii) providing gain control;
    a search node comprising a first scaling resample filter configured to scale the input image to generate a first scaled image,
        wherein the search node is configured to search, using a first search window, a portion of the first scaled image to detect presence of a human face, the first search window defining a search area of a predetermined size, and
        wherein the first scaling resample filter is configured to scale the input image by converting a first scaling ratio comprising a real-type number into a second scaling ratio comprising an integer-type number by multiplying the first scaling ratio with a first conversion factor programmed into the ASIC such that the first scaling resample filter operates to scale the input image based upon a first scaling relationship of height of the input image multiplied by the second scaling ratio equals height of the first scaled image multiplied by the first conversion factor; and
    an ensemble node comprising a second scaling resample filter to scale the input image to generate a second scaled image,
        wherein the ensemble node is configured to compare a portion of the second scaled image with a template to confirm presence of the human face in the input image, and
        wherein the second scaling resample filter is configured to scale the input image by converting a third scaling ratio comprising a real-type number into a fourth scaling ratio comprising an integer-type number by multiplying the third scaling ratio with a second conversion factor programmed into the ASIC such that the second scaling resample filter operates to scale the input image according to a second scaling relationship of height of the input image multiplied by the fourth scaling ratio equals height of the second scaled image multiplied by the second conversion factor,
    wherein upon the search node and ensemble node finding and confirming the presence of the human face in the input image, the search node determines a location of the face in the input image.

2. The ASIC of claim 1, wherein:
    multiplying the first scaling ratio with the first conversion factor does not result in the second scaling ratio comprising an integer-type number and the first scaling resample filter is further configured to remove a non-integer portion of the second scaling ratio from the second scaling ratio;
    the first scaling relationship comprises height of the input image multiplied by the second scaling ratio equals (height of the first scaled image multiplied by the first conversion factor) plus or minus an integer within a first range of integers to compensate for removal of the non-integer portion from the second scaling ratio, wherein the second scaling ratio is modified based upon the first scaling relationship by one of adding or subtracting a first integer within the first range of integers to or from the second scaling ratio;
    multiplying the second scaling ratio with the second conversion factor does not result in the fourth scaling ratio comprising an integer-type number and the second scaling resample filter is further configured to remove a non-integer portion of the fourth scaling ratio from the fourth scaling ratio; and
    the second scaling relationship comprises height of the input image multiplied by the fourth scaling ratio equals (height of the scaled image multiplied by the second conversion factor) plus or minus an integer within a second range of integers to compensate for removal of the non-integer portion from the fourth scaling ratio, wherein the fourth scaling ratio is modified based upon the second scaling relationship by one of adding or subtracting a second integer within the range of integers to or from the fourth scaling ratio.

3. The ASIC of claim 2, wherein the first conversion factor and the second conversion factor are equal.

4. The ASIC of claim 2, wherein the first conversion factor and the second conversion factor are not equal.

5. A method of searching for presence of an object within an image, the method comprising:
    processing, by an application specific integrated circuit (ASIC), the image;
    scaling, by the ASIC, the image to generate a first scaled image, wherein the scaling comprises converting a first scaling ratio comprising a real-type number into a second scaling ratio comprising an integer-type number by multiplying the first scaling ratio with a first conversion factor programmed into the ASIC to generate the second scaling ratio, wherein the scaling is performed based upon a first scaling relationship where a first dimension of the image multiplied by the second scaling ratio equals a second dimension of the first scaled image multiplied by the first conversion factor; and
    searching, by the ASIC, the first scaled image to detect the presence of the object using a first search window having a first predetermined size, the first predetermined size being smaller than a size of the first scaled image.

6. The method of claim 5, wherein:
    multiplying the first scaling ratio with the first conversion factor does not result in the second scaling ratio comprising an integer-type number and the method further comprises removing a non-integer portion of the second scaling ratio from the second scaling ratio;

the first scaling relationship comprises the first dimension of the input image multiplied by the second scaling ratio equals (height of the first scaled image multiplied by the first conversion factor) plus or minus an integer within a range of integers to compensate for removal of the non-integer portion from the second scaling ratio; and the second scaling ratio is modified based upon the first scaling relationship by one of adding or subtracting an integer within the range of integers to or from the second scaling ratio.

7. The method of claim 5, wherein the first conversion factor is one of (i) multiples of 10 or (ii) multiples of 2.

8. The method of claim 5, further comprising, upon determining the presence of the object in the image:

converting a third scaling ratio comprising a real-type number into a fourth scaling ratio comprising an integer-type number by multiplying the third scaling ratio with a second conversion factor programmed into the ASIC;

re-scaling, by the ASIC using the fourth scaling ratio, the image to generate a second scaled image, wherein the scaling is performed based upon a second scaling relationship where a first dimension of the image multiplied by the fourth scaling ratio equals a second dimension of the second scaled image multiplied by the second conversion factor; and comparing, by the ASIC, the second scaled image with a template to confirm the presence of the object in the image.

9. The method of claim 8, wherein:

multiplying the third scaling ratio with the second conversion factor does not result in the fourth scaling ratio comprising an integer-type number and the method further comprises removing a non-integer portion of the fourth scaling ratio from the fourth scaling ratio;

the second scaling relationship comprises the first dimension of the input image multiplied by the fourth scaling ratio equals (height of the first scaled image multiplied by the first conversion factor) plus or minus an integer within a range of integers to compensate for removal of the non-integer portion from the fourth scaling ratio; and the fourth scaling ratio is modified based upon the second scaling relationship by one of adding or subtracting an integer within the range of integers to or from the fourth scaling ratio.

10. The method of claim 8, wherein the first conversion factor equals the second conversion factor.

11. The method of claim 9, wherein the first range equals the second range.

12. The method of claim 8, wherein the second conversion factor is one of either (i) multiples of 10 or (ii) multiples of 2.

13. A portable electronic device comprising:

a camera to capture images; and an application specific integrated circuit (ASIC) configured to locate objects within the images, the ASIC comprising:

a first node configured to process an image; and a second node configured to search for the presence of an object in the image, wherein the second node is configured to search for the presence of the object by:

scaling, by the ASIC, the image to generate a first scaled image, wherein the scaling comprises converting a first scaling ratio comprising a real-type number into a second scaling ratio comprising an integer-type number by multiplying the first scaling ratio with a first conversion factor programmed into the ASIC to generate the second scaling ratio, wherein the scaling is performed based upon a first scaling relationship where a first dimension of the image multiplied by the second scaling ratio equals a second dimension of the first scaled image multiplied by the first conversion factor; and searching, by the ASIC, the first scaled image to detect the presence of the object using a first search window having a first predetermined size, the first predetermined size being smaller than a size of the first scaled image.

14. The portable electronic device of claim 13, wherein:

multiplying the first scaling ratio with the first conversion factor does not result in the second scaling ratio comprising an integer-type number and the second node is further configured to remove a non-integer portion of the second scaling ratio from the second scaling ratio;

the first scaling relationship comprises the first dimension of the input image multiplied by the second scaling ratio equals (height of the first scaled image multiplied by the first conversion factor) plus or minus an integer within a range of integers to compensate for removal of the non-integer portion from the second scaling ratio; and the second scaling ratio is modified based upon the first scaling relationship by one of adding or subtracting an integer within the range of integers to or from the second scaling ratio.

15. The portable electronic device of claim 13, wherein the first conversion factor is one of either (i) multiples of 10 or (ii) multiples of 2.

16. The portable electronic device of claim 15, wherein the ASIC further comprises a third node configured to, upon determining the presence of the object in the image, confirm the presence of the object in the image, wherein the confirming comprises:

converting a third scaling ratio comprising a real-type number into a fourth scaling ratio comprising an integer-type number by multiplying the third scaling ratio with a second conversion factor programmed into the ASIC;

re-scaling, by the ASIC using the fourth scaling ratio, the image to generate a second scaled image, wherein the scaling is performed based upon a second scaling relationship where a first dimension of the image multiplied by the fourth scaling ratio equals a second dimension of the second scaled image multiplied by the second conversion factor; and comparing, by the ASIC, the second scaled image with a template to confirm the presence of the object in the image.

17. The portable electronic device of claim 16, wherein:

multiplying the third scaling ratio with the second conversion factor does not result in the fourth scaling ratio comprising an integer-type number and the third node is further configured to remove a non-integer portion of the fourth scaling ratio from the fourth scaling ratio;

the second scaling relationship comprises the first dimension of the input image multiplied by the fourth scaling ratio equals (height of the first scaled image multiplied by the first conversion factor) plus or minus an integer within a range of integers to compensate for removal of the non-integer portion from the fourth scaling ratio; and the fourth scaling ratio is modified based upon the second scaling relationship by one of adding or subtracting an integer within the range of integers to or from the fourth scaling ratio.

18. The portable electronic device of claim 16, wherein the first conversion factor equals the second conversion factor.

19. The portable electronic device of claim 17, the first range equals the second range.

20. The portable electronic device of claim 16, wherein the first precision factor is one of either (i) multiples of 10 or (ii) multiples of 2.

* * * * *